United States Patent
Wang et al.

(10) Patent No.: US 11,827,245 B2
(45) Date of Patent: Nov. 28, 2023

(54) SYSTEMS AND METHODS FOR ESTIMATING MOTION OF AN AUTOMATED VEHICLE FOR COOPERATIVE DRIVING

(71) Applicant: Toyota Motor Engineering & Manufacturing North America, Inc., Plano, TX (US)

(72) Inventors: Ziran Wang, San Jose, CA (US); Kyungtae Han, Palo Alto, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 225 days.

(21) Appl. No.: 17/196,016

(22) Filed: Mar. 9, 2021

(65) Prior Publication Data
US 2022/0289244 A1 Sep. 15, 2022

(51) Int. Cl.
*B60W 60/00* (2020.01)

(52) U.S. Cl.
CPC .............................. *B60W 60/0027* (2020.02)

(58) Field of Classification Search
CPC .................................................. B60W 60/0027
See application file for complete search history.

(56) References Cited

U.S. PATENT DOCUMENTS

| 9,927,816 B2 * | 3/2018 | Li ........................ B60K 31/00 |
| 2017/0227972 A1 * | 8/2017 | Sabau ................... G05D 1/0027 |
| 2017/0369062 A1 * | 12/2017 | Saigusa ................. B60W 50/04 |
| 2019/0088135 A1 * | 3/2019 | Do ........................ G05D 1/0088 |
| 2019/0232962 A1 * | 8/2019 | Broll ..................... G08G 1/162 |

(Continued)

FOREIGN PATENT DOCUMENTS

WO 2020205655 A1 10/2020

OTHER PUBLICATIONS

Ziran Wang, Guoyuan Wu, Kanok Boriboonsomsin, "Cooperative Ramp Merging System: Agent Based Modeling and Simulation Using Game Engine", SAE International Journal of Connected and Automated Vehicles 2(2), (Year: 2019).*

(Continued)

*Primary Examiner* — Khoi H Tran
*Assistant Examiner* — Tristan J Greiner
(74) *Attorney, Agent, or Firm* — Christopher G. Darrow; Darrow Mustafa PC (57) ABSTRACT

System, methods, and other embodiments described herein relate to a control system to improve estimating motion for an automated vehicle related to cooperative driving. In one embodiment, a method includes monitoring, by an ego vehicle, a communication link for motion data of a target vehicle, used in a model to determine motion, for motion planning by the ego vehicle. The method also includes estimating trajectory of the target vehicle according to a motion estimate by the model when criteria for the communication link are unsatisfied. The method also includes adjusting the motion estimate using a modified model, adapted for speed of the target vehicle, when the criteria for the communication link are satisfied. The method also includes controlling the ego vehicle according to the trajectory and the motion estimate.

20 Claims, 5 Drawing Sheets

(56) References Cited

U.S. PATENT DOCUMENTS

2019/0258251 A1    8/2019 Ditty et al.

OTHER PUBLICATIONS

Gao et al., "Robust control of heterogeneous vehicular platoon with uncertain dynamics and communication delay," IET Intelligent Transport Systems, vol. 10, No. 7, pp. 503-513, 2016.

Petrillo et al., "Adaptive multi-agents synchronization for collaborative driving of autonomous vehicles with multiple communication delays," Transportation Research Part C: Emerging Technologies, vol. 86, pp. 372-392, 2018.

Bernardo et al., "Distributed consensus strategy for platooning of vehicles in the presence of time-varying heterogeneous communication delays," IEEE Transactions on Intelligent Transportation Systems, vol. 16, No. 1, pp. 102-112, Feb. 2015.

Bernardo et al., "Design, analysis, and experimental validation of a distributed protocol for platooning in the presence of time-varying heterogeneous delays," IEEE Transactions on Control Systems Technology, vol. 24, pp. 413-427, 2016.

Chehardoli et al., "Third-order safe consensus of heterogeneous vehicular platoons with MPF network topology: Constant time headway strategy," Proceedings of the Institution of Mechanical Engineers, Part D:Journal of Automobile Engineering, vol. 232, No. 10,pp. 1402-1413, 2018.

Ploeg et al., "Graceful degradation of cooperative adaptive cruise control," IEEE Transactions on Intelligent Transportation Systems, vol. 16, pp. 488-497, Feb. 2015.

Harfouch et al., "An adaptive switched control approach to heterogeneous platooning with inter vehicle communication losses," IEEE Transactions on Control of Network Systems, vol. 5, pp. 1434-1444, Sep. 2018.

Xiao et al., "Practical string stability of platoon of adaptive cruise control vehicles," IEEE Transactions on Intelligent Transportation Systems, vol. 12, No. 4, pp. 1184-1194, Dec. 2011.

Milanes et al., "Cooperative adaptive cruise control in real traffic situations," IEEE Transactions on Intelligent Transportation Systems, vol. 15, pp. 296-305, Feb. 2014.

Wang et al., "Lookup table-based consensus algorithm for real-time longitudinal motion control of connected and automated vehicles," in 2019 American Control Conference (ACC), pp. 5298-5303, 2019.

Zhang et al., "Cooperative adaptive cruise control with robustness against communication delay: an approach in the space domain," IEEE Transactions on Intelligent Transportation Systems, pp. 1-12, Apr. 2020.

Saifuddin et al., "Performance analysis of cellular-V2X with adaptive and selective power control," pp. 1-7, Aug. 8, 2020.

Pan et al., "Controller design for V2X application under unreliable feedback channel," 2019 IEEE Intelligent Transportation Systems Conference, pp. 2496-2502, 2019.

Li et al., "Nonlinear consensus-based connected vehicle platoon control incorporating car-following interactions and heterogeneous time delays," in IEEE Transactions on Intelligent Transportation Systems, vol. 20, No. 6, pp. 2209-2219, Jun. 2019.

Kesting et al., "Enhanced intelligent driver model to access the impact of driving strategies on traffic capacity," Phil. Trans. R. Soc. A. 368, pp. 4585-4605, Oct. 13, 2010.

\* cited by examiner

SYSTEMS AND METHODS FOR ESTIMATING MOTION OF AN AUTOMATED VEHICLE FOR COOPERATIVE DRIVING

TECHNICAL FIELD

The subject matter described herein relates, in general, to estimating motion of a vehicle, and, more particularly, to estimating motion of an automated vehicle for cooperative driving.

BACKGROUND

Vehicles may be equipped with sensors that facilitate perceiving other vehicles and additional aspects of a surrounding environment. For example, a vehicle may be equipped with a light detection and ranging (LIDAR) sensor that uses light to scan the surrounding environment. In further examples, additional sensors such as cameras may be implemented to acquire information about the surrounding environment from which a system derives awareness about aspects of the surrounding environment.

In general, the further awareness is developed by the vehicle about a surrounding environment, the better an automated system can control the vehicle to avoid other vehicles. For example, a connected and automated vehicle (CAV) may communicate with vehicles for safety and control. The CAVs can use vehicular communications to obtain the states of vehicles beyond measurement ranges and information unavailable to remote sensors. A CAV may use the states and other information to supplement data from on-board sensors, such as LIDAR, for perception. However, vehicular communications, such as dedicated short-range communications (DSRC), vehicle-to-everything (V2X), and so on may incur delays and packet losses, thereby reducing the performance of CAV applications. For instance, a CAV that receives a motion estimate of another CAV may be stale beyond a certain delay. To reduce delays, CAVs may use time-delay synthesizing, an H-infinity component, multiple time-varying delays with feedback gains, and so on. In addition, delays may be reduced using consensus-based cooperative adaptive cruise control (CACC) mode to aggregate delay. Still, the CAVs compensating delay through these operations may be insufficient.

Moreover, a control system of a vehicle may avoid V2X due to packet losses on an air interface. For example, the control system may use acceleration estimates according to on-board sensors in view of communication failures to achieve the transition from CACC to adaptive cruise control (ACC) mode seamlessly. However, an automated vehicle operating in ACC mode due to communication delays or packet loss may result in decreased effectiveness for estimating motion associated with automated driving, safety, and so on.

SUMMARY

In one embodiment, example systems and methods relate to a control system to improve estimating motion for an automated vehicle in relation to cooperative driving. In various implementations, automated driving using cooperative or consensus-based operations for estimating motion may be suboptimal due to communication delays or packet losses of a wireless network. Accordingly, automated driving systems (ADS) may encounter difficulties for efficiently and accurately estimating motion causing frustration. Therefore, in one embodiment, the control system may control ego motion by estimating the position and speed of a target CAV in the presence of communication delays and packet losses. In particular, the control system may maintain the ego vehicle in cooperative adaptive cruise control (CACC) instead of switching to adaptive cruise control (ACC) mode due to degraded communication using models of a target vehicle thereby improving performance.

Moreover, ego vehicles maintaining CACC in an area improve the accuracy of estimated motion associated with target vehicles by consensus, thereby resulting in more reliable motion control. Furthermore, the ego vehicle may use a ground-truth from sensor data of the target vehicle received over the wireless network once communication conditions improve and continue operation in CACC mode. In this way, the CAVs in an area remain in CACC mode and operate more reliably for improved cooperative driving.

In one embodiment, a control system for improving the estimation of motion for an automated vehicle related to cooperative driving is disclosed. The control system includes a memory communicably coupled to a processor. The memory stores a control module including instructions that when executed by the processor cause the processor to monitor, by an ego vehicle, a communication link for motion data of a target vehicle, used in a model to determine motion, for motion planning by the ego vehicle. The control module also includes instructions to estimate trajectory of the target vehicle according to a motion estimate by the model when criteria for the communication link are unsatisfied. The control module also includes instructions to adjust the motion estimate using a modified model, adapted for speed of the target vehicle, when the criteria for the communication link are satisfied. The control module also includes instructions to control the ego vehicle according to the trajectory and the motion estimate.

In one embodiment, a non-transitory computer-readable medium for improving the estimation of motion for an automated vehicle related to cooperative driving and including instructions that when executed by a processor cause the processor to perform one or more functions is disclosed. The instructions include instructions to monitor, by an ego vehicle, a communication link for motion data of a target vehicle, used in a model to determine motion, for motion planning by the ego vehicle. The instructions also include instructions to estimate trajectory of the target vehicle according to a motion estimate when criteria for the communication link are unsatisfied. The instructions also include instructions to adjust the motion estimate using a modified model, adapted for speed of the target vehicle, when the criteria for the communication link are satisfied. The instructions also include instructions to control the ego vehicle according to the trajectory and the motion estimate.

In one embodiment, a method for improving the estimation of motion for an automated vehicle related to cooperative driving is disclosed. In one embodiment, the method includes monitoring, by an ego vehicle, a communication link for motion data of a target vehicle, used in a model to determine motion, for motion planning by the ego vehicle. The method also includes estimating trajectory of the target vehicle according to a motion estimate by the model when criteria for the communication link are unsatisfied. The method also includes adjusting the motion estimate using a modified model, adapted for speed of the target vehicle, when the criteria for the communication link are satisfied. The method also includes controlling the ego vehicle according to the trajectory and the motion estimate.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the estimation of motion for an automated vehicle using cooperative driving are disclosed herein. A control system of an ego vehicle may control motion, as a connected and automated vehicle (CAV), according to ground-truths associated with sensor data of a target vehicle when criteria are unsatisfied. The criteria may be associated with packet losses or the degree of delays for a communication link between the ego vehicle, target vehicle, cloud server, or edge server. For example, the packet losses or delays may be associated with an application in the upper layer of a communication stack in the ego vehicle that relies on cooperative driving. The packet losses or delays may also be caused by fading, bit errors, path loss, and so on of the air interface between CAVs.

Moreover, the control system may use the ground-truths to determine a motion plan. However, during a time period or time-step when the communication link degrades and criteria are satisfied, information flows among CAVs exist virtually by the ego vehicle calculating the estimated motions of CAVs using different models instead of the ground-truths of motion. For example, a communication link may degrade and become sporadic due to motion, buildings, non-line of sight, obstacles, and so on.

In one approach, the different models may be used according to speed of the target vehicles in the area and a time-step of the delay. The ego vehicle may combine the estimated motions during degraded communications for a target vehicle with existing motion estimates determined from the ground-truths. When criteria again are unsatisfied, the ego vehicle uses the information flows among the CAVs (i.e. target vehicles) and motion control determined according to the ground-truths received from the CAVs. In this way, CAVs in an area stay in adaptive cruise control (ACC) instead of cooperative ACC (CACC) mode due to information flows consistently or virtually being active, thereby avoiding system disruption or degradation from CAVs switching to non-cooperative mode.

Figure 1:
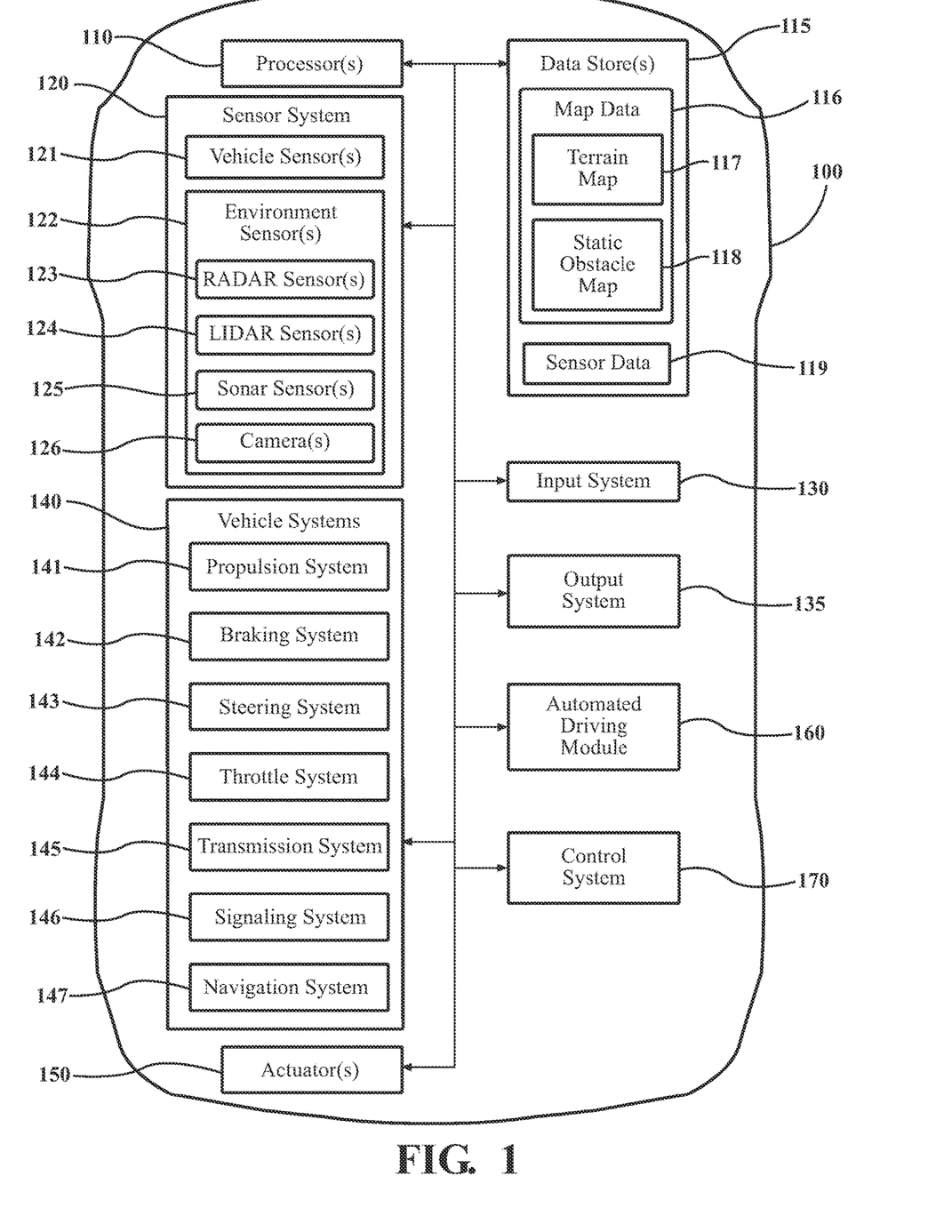
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with a control system to improve estimating motion for an automated vehicle while maintaining cooperative driving. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements. It will be understood that in various embodiments, the vehicle 100 may have less than the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a control system 170 that is implemented to perform methods and other functions as disclosed herein relating to improving the estimation of motion for an automated vehicle while maintaining cooperative driving. As will be discussed in greater detail subsequently, the control system 170, in various embodiments, is implemented partially within the vehicle 100, and as a cloud-based service. For example, in one approach, functionality associated with at least one module of the control system 170 is implemented within the vehicle 100 while further functionality is implemented within a cloud-based computing system.

Figure 2:
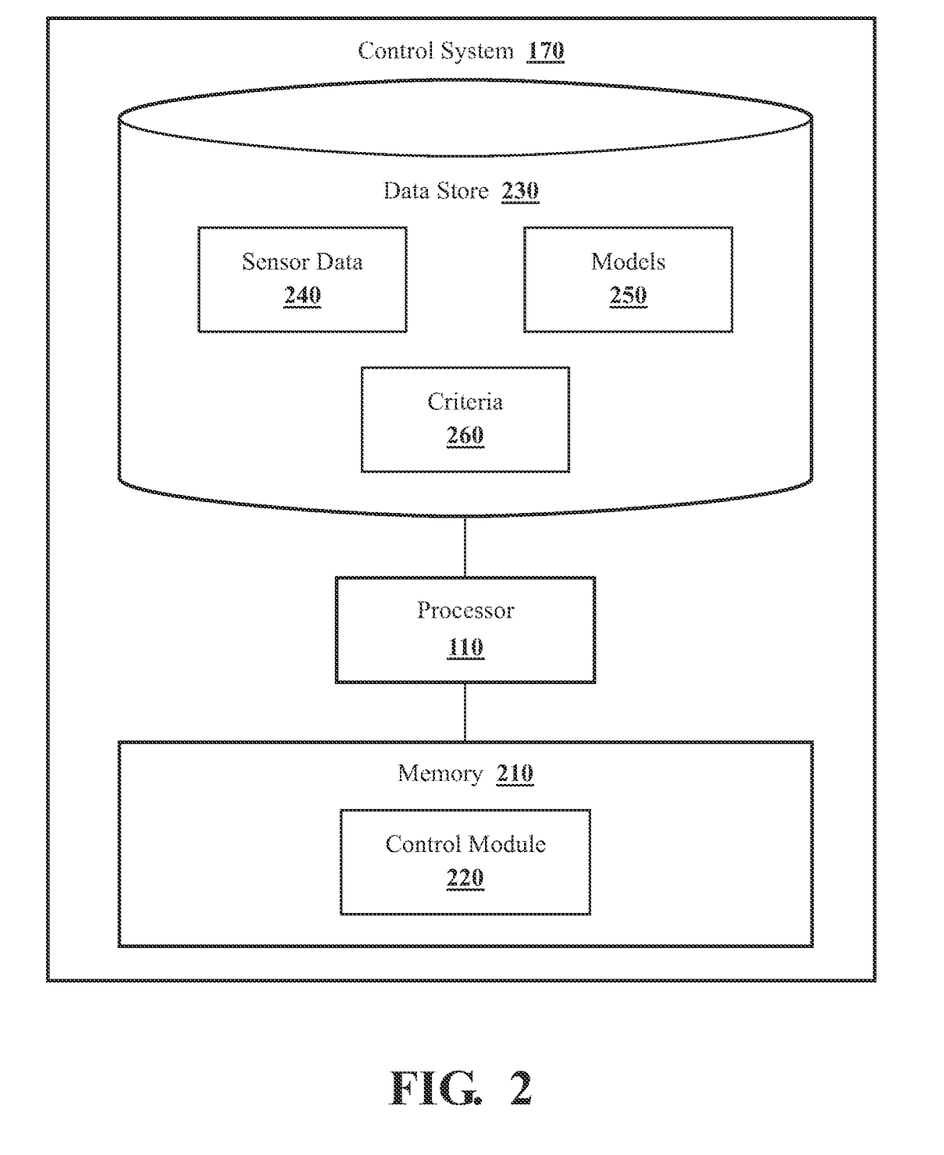
FIG. 2 illustrates one embodiment of a control system to estimate motion for an ego vehicle while maintaining cooperative driving.

Now referencing FIG. 2, one embodiment of the control system 170 of FIG. 1 is further illustrated. The control system 170 is shown as including a processor 110 from the vehicle 100 of FIG. 1. Accordingly, the processor 110 may be a part of the control system 170, the control system 170 may include a separate processor from the processor 110 of the vehicle 100, or the control system 170 may access the processor 110 through a data bus or another communication path. In one embodiment, the control system 170 includes a memory 210 that stores a control module 220. The memory 210 is a random-access memory (RAM), read-only memory (ROM), a hard-disk drive, a flash memory, or other suitable memory for storing the control module 220. The control module 220 is, for example, computer-readable instructions that when executed by the processor 110 cause the processor 110 to perform the various functions disclosed herein.

The control system 170 as illustrated in FIG. 2 is generally an abstracted form of the control system 170 as may be implemented between the vehicle 100 and a cloud-computing environment. Furthermore, with reference to FIG. 2, the control module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the control module 220, in one embodiment, may acquire sensor data 240 that includes at least camera images for perception. In further arrangements, the control module 220 acquires the sensor data 240 from further sensors such as radar sensors 123, LIDAR sensors 124, and other sensors as may be suitable for identifying vehicles and locations of the vehicles. In addition, the sensor data 240 may include ground-truths of direct observations associated with motion of target vehicles or CAVs or underlying facts related to a motion or trajectory of the target vehicle received over a network. In one approach, the control module 220 may use the ground-truths to control motion for cooperative or consensus-based motion control.

Accordingly, the control module 220, in one embodiment, controls the respective sensors to provide the data inputs in the form of the sensor data 240. Additionally, while the control module 220 is discussed as controlling the various sensors to provide the sensor data 240, in one or more embodiments, the control module 220 can employ other techniques to acquire the sensor data 240 that are either active or passive. For example, the control module 220 may passively sniff the sensor data 240 from a stream of electronic information provided by the various sensors to further components within the vehicle 100. Moreover, the control module 220 can undertake various approaches to fuse data from multiple sensors when providing the sensor data 240 and/or from sensor data acquired over a wireless communication link. Thus, the sensor data 240, in one embodiment, represents a combination of perceptions acquired from multiple sensors.

Moreover, in one embodiment, the control system 170 includes a data store 230. In one embodiment, the data store 230 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 230 stores data used by the control module 220 in executing various functions. In one embodiment, the data store 230 includes the sensor data 240 along with, for example, metadata that characterize various aspects of the sensor data 240. For example, the metadata can include location coordinates (e.g., longitude and latitude), relative map coordinates or tile identifiers, time/date stamps from when the separate sensor data 240 was generated, and so on.

In one embodiment, the data store 230 further includes the models 250 and criteria 260. The models 250 may be a function(s) or algorithms used to estimate the motion of CAVs, such as a target vehicle(s). The models 250 may be pre-installed, updated, or received by the vehicle 100. As explained below, the function(s) may factor longitudinal motion, lateral motion, future horizon, future speed, future trajectory, future position, longitudinal position, longitudinal trajectory, target speed, and so on associated with CAVs. Also as further explained below, the criteria 260 may be related to packet loss for a certain time-step, a communication link disabled due to packet losses, the magnitude of a time-step, a delay below a time-step for a prediction, a duration of a time-step, and so on.

Furthermore, the control module 220, in one embodiment, is further configured to perform additional tasks beyond controlling the respective sensors to acquire and provide the sensor data 240. For example, the control module 220 includes instructions that cause the processor 110 to control the motion of an ego vehicle using motion estimates for a target vehicle that are received over a wireless network while a communication link is stable. The communication link may be stable when the criteria 260 are unsatisfied. In one approach, the communication module may estimate the ego motion using motion information and a trajectory of the target vehicle according to the models 250 and criteria 260.

Additional aspects to estimate motion for control of an ego vehicle while maintaining cooperative driving will now be discussed in relation to FIG. 3. As a brief introduction to the method 300, prior to the discussion of the explicitly identified functions, an ego vehicle and target vehicle(s) may operate in an environment for cooperative driving prone to communication issues. For example, a communication link(s) to the target vehicle(s), an edge server, a cloud server, and so on may degrade due to motion, buildings, non-line of sight, obstacles, obstructions, and so on. The communication link may utilize cellular, 802.11x, dedicated short-range communications (DSRC), vehicle-to-everything (V2X), cellular V2X (C-V2X), and so on. In one approach, the control system 170 may monitor the communication link to determine initial ego motion using motion information from the target vehicle. In particular, the control system 170 may determine ego motion according to motion information estimated for the target vehicle, according to a model, received over a network while the communication link is stable. If the communication link becomes unstable due to packet losses or delays that satisfy the criteria 260, the control system 170 may control the motion of the ego vehicle using motion estimates for the target vehicle according to a model and a modified model particular to degraded communications. In this way, the control system 170 may maintain cooperative driving between the ego vehicle and target vehicle and sustain a consensus for motion of the CAVs in an area.

Moreover, the method 300 will be discussed from the perspective of the control system 170 of FIGS. 1 and 2. While method 300 is discussed in combination with the control system 170, it should be appreciated that the method 300 is not limited to being implemented within the control system 170 but is instead one example of a system that may implement the method 300. In various embodiments, Equations (1)-(13) below provide models, derivations, and calculations for an ego vehicle $i$ and other CAVs in an area to maintain cooperative driving in the presence of packet losses and delays on a communication link. For example, Equation (5) are functions a system may use during CACC to achieve the consensus dynamics of CAVs.

At 310, the control module 220 monitors a communication link to receive motion data of a target vehicle, according to a model from the models 250, such as to determine a motion plan for controlling the ego vehicle. In vehicle 100, the control system 170 may use the received motion estimate to supplement other data for controlling motion when the criteria 260 are unsatisfied. The communication link may utilize cellular, 802.11x, DSRC, V2X, C-V2X, and so on for CAV operation. For example, the system 400 of FIG. 4 illustrates a communication link(s) using V2X between an ego vehicle i and a target vehicle j operating in a CAV environment. The ego vehicle i and a target vehicle j may be configured as described in vehicle 100. In system 400, both vehicles may also utilize links to an edge server, cloud, and so on 402 for motion estimation or control.

For the ego vehicle i, Equation (1) may be used to control the ego motion:

$$\dot{r}_i(t) = v_i(t)$$
$$\dot{v}_i(t) = a_i(t)$$
$$a_i(t) = \frac{1}{m}\left[F_{net_i}(t) - R_i T_{br_i}(t) - c_{vi}v_i(t)^2 - c_{fi}v_i(t) - d_{mi}(t)\right].$$

Equation (1)

In Equation (1), $r_i(t)$, $v_i(t)$, and $a_i(t)$ denote the longitudinal position, longitudinal speed, and longitudinal acceleration of vehicle i at time t, respectively. Furthermore, $m_i$ denotes the mass of vehicle i, $F_{net i}$ denotes the net engine force of vehicle i at time t, which mainly depends on the vehicle speed and the throttle angle, and $R_i$ denotes the effective gear ratio from the engine to the wheel of vehicle i. The parameter $T_{bri}(t)$ denotes the brake torque of vehicle i at time t, $c_{vi}$ denotes the coefficient of aerodynamic drag of vehicle i, $c_{fi}$ denotes the coefficient of friction force of vehicle i, and $d_{mi}(t)$ denotes the mechanical drag of vehicle i at time t.

Moreover, one of the models 250 may be derived from the principle of vehicle dynamics when the braking maneuver is deactivated, i.e., vehicle i is accelerating by the net engine force:

$$F_{net_i}(t) = \ddot{x}_i(t)m_i + c_{vi}\dot{x}_i(t)^2 + c_{pi}\dot{x}_i(t) + d_{mi}(t).$$

Equation (2)

On the contrary, Equation (3) may represent when the braking maneuver is activated, i.e. vehicle i decelerates by the brake torque:

$$T_{br_i}(t) = \frac{\dot{x}_i(t)m_i + c_{vi}\dot{x}_i(t)^2 + c_{pi}\dot{x}_i(t) + d_{mi}(t)}{R_i}.$$

Equation (3)

In one approach, the net engine force may be a function of the vehicle speed and the throttle angle, which may be related to the steady-state characteristics of engine and transmission systems. In addition, the control module 220 for a CAV may utilize a hierarchical strategy, where a high-level controller generates a target acceleration. High-level control of the vehicle 100 actuators may involve the first two functions of Equation (1). Low-level control of the vehicle 100 actuators to track the target acceleration may involve the last function of Equation (1).

As further explained below, at 310 the control module 220 may control the longitudinal position of the ego vehicle i such that consensus between vehicles is maintained dynamically in an area. In system 400, r, v, a, and l may denote the longitudinal position, longitudinal speed, longitudinal acceleration, and length, respectively, of the ego and the target vehicle. In one approach, Equation (4) may represent the consensus dynamics of CAVs:

$$r_i(t) \to r_j(t) - r_{headway}$$
$$v_i(t) \to v_j(t)$$
$$a_i(t) \to a_j(t).$$

Equation (4)

In Equation (4), $r_{headway}$ denotes the desired distance or headway between the ego and the target vehicle. As such, Equation (4) may be utilized for CACC, speed harmonization, cooperative control of longitudinal motion, and so on.

Furthermore, in system 400 packet losses and time delay may degrade or impair the ability of CAVs to maintain cooperative control of longitudinal motion. Therefore, in one approach the control system 170 may utilize various models to maintain cooperative driving among CAVs. For example, Equation (5) may represent functions to achieve the consensus dynamics of CAVs by a double-integrator for control of longitudinal motion:

$$\dot{r}_i(t) = v_i(t)$$
$$\dot{v}_i(t) = -a_{ij}k_{ij}\cdot[(r_i(t) - r_j(t) + l_j + v_i(t)\cdot t_{ij}^g(t)) + \gamma_i(v_i(t) - v_j(t))].$$

Equation (5)

In Equation (5), $\alpha_{ij}$ is the adjacency matrix of the directed graph or communication topology between vehicle i and j. Furthermore, $t^g_{ij}(t)$ is the time-variant desired time gap between two vehicles, which may be adjusted according to road grade, vehicle mass, braking ability, and so on.

For the term $r_{headway}$ in Equation (4), the system 400 may use the term $[l_j + v_i(t)t^g_{ij}(t)]$ as another form to determine headway. Moreover, the control gains $k_{ij}$ and $\gamma_i$ may be constants or further tuned by a feed-forward control function according to desired safety, efficiency, comfort, following distance, and so on. Furthermore, the control system 170 may utilize a lookup-table to dynamically calculate control gains, such as based on the initial speeds of two vehicle i and j, as well as initial headway to improve accuracy. This can be summarized in Equation (6) as:

$$\{k_{ij}, \gamma_i\} = f(v_i(0), v_j(0), r_i(0) - r_j(0)).$$

Equation (6)

Using Equation (5), vehicle i may converge longitudinal speed $v_i(t)$ to the longitudinal speed $v_j(t)$ of vehicle j to control of longitudinal motion. Similarly, vehicle j may converge longitudinal position $r_i(t)$ to longitudinal position $r_j(t)$ minus a desired headway space. In this way, an ego vehicle i maintains a safe speed and position relative to vehicle j during CACC.

Figure 3:
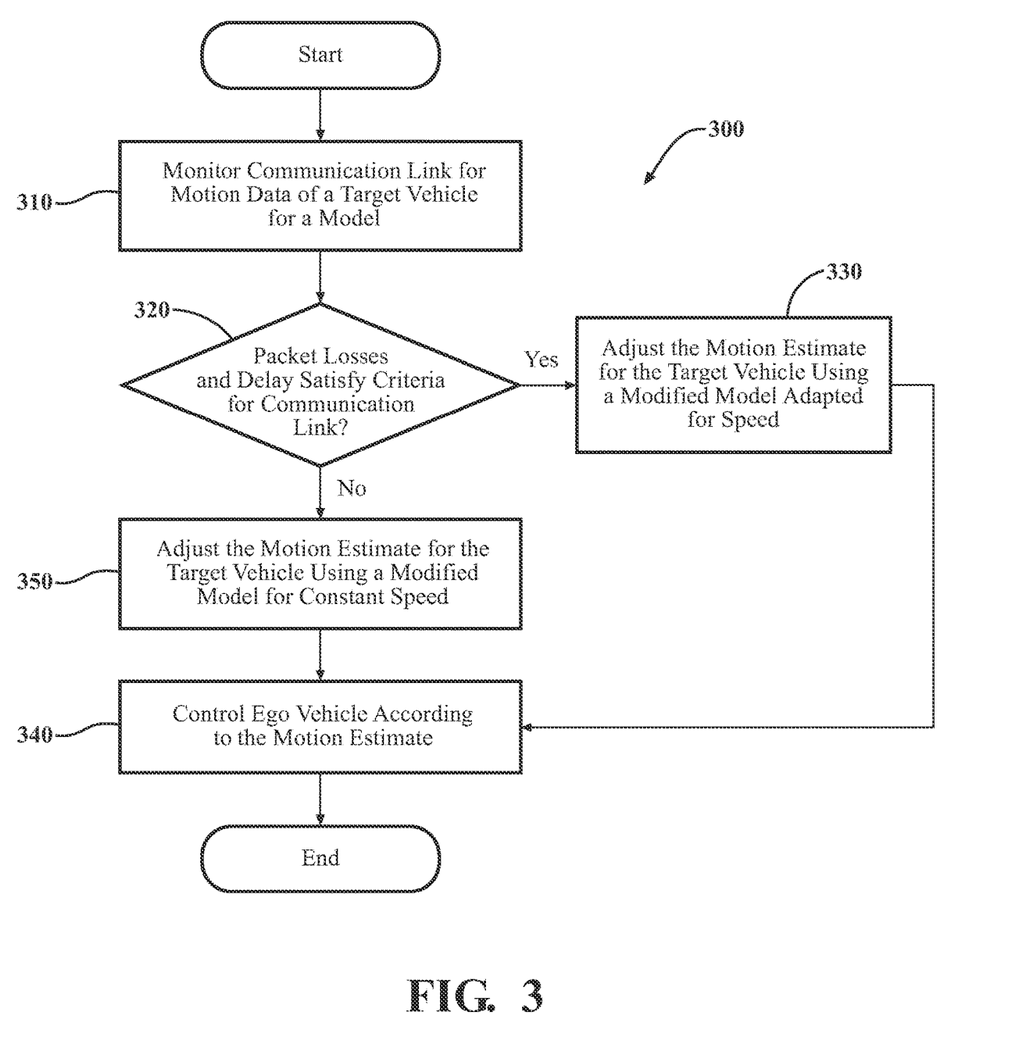
FIG. 3 illustrates one embodiment of a method to estimate motion for control of an ego vehicle while maintaining cooperative driving.
Figure 4:
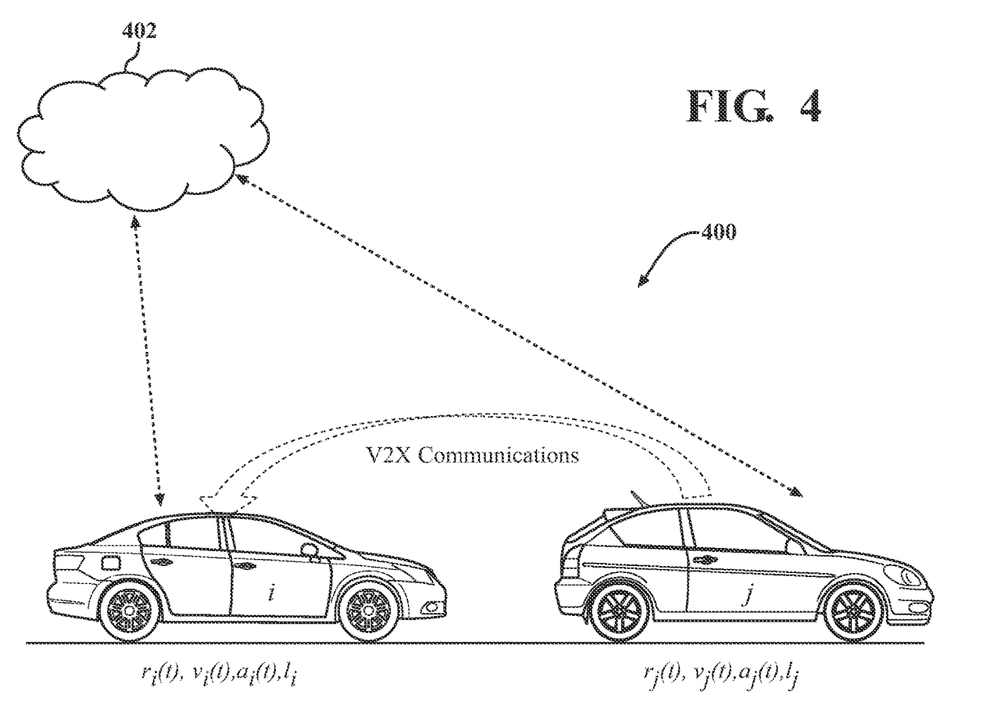
FIG. 4 illustrates a network for cooperative driving involving an ego vehicle and a target vehicle.

Still referring to FIG. 3, at 320 the control system 170 determines whether packet losses and delay satisfy criteria 260 for the communication link. The criteria 260 may be related to packet loss for a certain time-step, a communication link disabled due to packet losses, the magnitude of a time-step, a delay below a time-step for a prediction, a duration of a time-step, and so on. As such, the control system 170 may accordingly adjust trajectory or motion for vehicle i.

Regarding delays on the communication link, information vehicle i receives from vehicle j may be stale or outdated due to the unavoidable transmission time $\tau_{ij}(t)$. Accordingly, Equation (5) may factor time-variation of communication delays as follows:

$$\dot{r}_i(t) = v_i(t)$$
$$\dot{v}_i(t) = -a_{ij}k_{ij}\cdot[(r_i(t) - r_j(t - \tau ij(t)) + l_j + v_i(t)\cdot t_{ij}^g(t)) + \gamma_i(v_i(t) - v_j(t - \tau ij(t)))].$$

Equation (7)

In this way, the ego vehicle i may maintain CACC mode in the presence of delays satisfying the criteria 260.

In association with delays, in one arrangement, the control system 170 may utilize the following algorithm based on conditions of the communication link:

---

Result: Vehicle j's estimated longitudinal motion $V_j(t)$ and $R_j(t)$ in the future horizon [t + 1, t + N]
Vehicle i associates with its target vehicle j, where j = i − 1;
while communication between vehicle i and j is currently on do
    if n = j == 0, namely vehicle j is the leader of a communication topology and does not have any target vehicle then
        Vehicle j estimate its future longitudinal speed trajectory $V_j(t)$ based on Equations (8) to (8-1);
        Vehicle j cumulatively estimates its future longitudinal position trajectory $\tilde{R}_j(t)$ based on Equations (9) to (9-1);
    else
        for n = 1 → j do
            if Vehicle n is connected to its target vehicle n − 1, namely no packet loss is in presence at this time step t then
                Vehicle n estimatest its future speed longitudinal trajectory $\tilde{V}_n(t)$ based on $\tilde{V}_{n-1}(t)$ and $\tilde{R}_{n-1}(t)$ with Equations (10) to (13-1);
            else
                Vehicle n's future speed longitudinal trajectory estimate stays the same since no information update $\tilde{V}_n(t) = \tilde{V}_n(t - 1)$;
            end
            Vehicle n cumulatively estimates its future longitudinal position trajectory $\tilde{R}_n(t)$ based on $\tilde{V}_n(t)$ with Equations (9) to (9-1);
        end
        Vehicle j's estimated motion $\tilde{V}_j(t)$ and $\tilde{R}_j(t)$ can be derived when n == j;
    end
    Vehicle j sends $\tilde{V}_j(t)$ and $\tilde{R}_j(t)$ to its following vehicle i;
end
while communication between vehicle i and j is currently off due to packet loss do
    At time step (t + k) ⊆ [t + 1, t + N], vehicle i extras $\tilde{v}_j(t + k)$ from $\tilde{V}_j(t)$, and $\tilde{r}_j(t + k)$ from $\tilde{R}_j(t)$, and uses them as the inputs of the motion control algorithm;
end
Vehicle i disassociates with its target vehicle j;

---

In system 400, when the communication link is free of packet losses, the control system 170 may use Equation (8) at 310 to estimate the longitudinal speed trajectory of vehicle j in the future without any target vehicle(s) to follow:

$$\tilde{v}_j(t+k) = \tilde{v}_j(t+k+1) + a_j^{max} \cdot \left[1 - \left(\frac{\tilde{v}_j(t+k+1)}{v_j(t \to \infty)}\right)^\sigma\right] \cdot \delta t. \quad \text{Equation (8)}$$

As such, vehicle j will converge to a target speed $v_j(t \to \infty)$, which is a known and preset value. In Equation (8), k⊆[1, N], and $\tilde{v}_j(t)=v_j(t)$; $a_j^{max}$ may be a constant denoting the maximum changing rate of longitudinal speed (e.g. 0.73 m/s²) for vehicle j. In addition, the parameter σ may be the free acceleration exponent of an existing intelligent driver model (IDM), which characterizes how the acceleration of the vehicle decreases with speed (e.g. 4), with t as the duration of a time-step for a prediction. Based on Equation (8), the longitudinal speed trajectory of vehicle j in the future may be given as:

$$\tilde{V}_j(t)=(\tilde{v}_j(t+1), \tilde{v}_j(t+2), \tilde{v}_j(t+k) \ldots, \tilde{v}_j(t+N)). \quad \text{Equation (8-1)}$$

In one approach, absent of packet losses, the control system 170 may also use Equation (9) to control the ego motion at 310. Equation (9) estimates longitudinal position trajectory $\tilde{R}_n(t)$ of vehicle n in the future according to estimated speed trajectory $\tilde{V}_n(t)$:

$$\tilde{r}_n(t+k)=\tilde{r}_n(t+k-1)+\tilde{v}_n(t+k-1)\cdot\delta t. \quad \text{Equation (9)}$$

In Equation (9), k⊆[1, N], and $\tilde{r}_n(t)=r_n(t)$. Thus, the longitudinal position trajectory of vehicle n in the future may be:

$$\tilde{R}_n(t)=(r\tilde{r}_n(t+1), r\tilde{r}_n(t+2), \ldots, r\tilde{r}_n(t+k), \ldots, r\tilde{r}_n(t+N)). \quad \text{Equation (9-1)}$$

In FIG. 3, at 330 the control system 170 of the ego vehicle may calculate the motion estimate for the target vehicle according to a modified model for adapted speed. The modified model may be part of models 250 and may be based on Equations (10)-(13-1). In Equation (10), the control system 170 may estimate the longitudinal speed trajectory of vehicle n in the future when following the target vehicle (n−1) in the presence of significant communication delays. A representation of the communication delay may be $\tau_{n(n-1)}(t+k)$. When $\tau_{n(n-1)}(t+k)<\delta t$, namely the communication delay is less than the duration of a time-step for a prediction, then the target longitudinal speed of vehicle (n−1) may be unchanged during this delayed period:

$$\tilde{v}_{n-1}(t+k)=\tilde{v}_{n-1}(t+k-\tau_{n(n-1)}(t+k)). \quad \text{Equation (10)}$$

Conversely, when $\tau_{n(n-1)}(t+k)>=\delta t$ the delay in the communication link may be equal to or longer than the duration of a time-step for a prediction. As such, the control system 170 may utilize Equation (11) as follows:

$$\tilde{v}_{n-1}(t+k) = \tilde{v}_{n-1}(t+k-\tau_{n(n-1)}(t+k)) + \frac{\tau_{n(n-1)}(t+k)}{\delta t} \cdot \tilde{v}_{n-1}(t+k-\tau_{n(n-1)}(t+k)). \quad \text{Equation (11)}$$

For either condition of the time-step for a prediction, the longitudinal position of the target vehicle (n−1) may be adjusted by Equation (12) as follows:

$$\tilde{r}_{n-1}(t+k)=\tilde{r}_{n-1}(t+k-1)+\tilde{v}_{n-1}(t+k)\cdot\tau_{n(n-1)}(t+k). \quad \text{Equation (12)}$$

The control system 170 may use the longitudinal motion of vehicle (n−1) in the future at each time-step to estimate the longitudinal speed in the future of vehicle n as follows:

$$\tilde{v}_n(t+k)=\tilde{v}_n(t+k-1)-a_{n(n-1)}k_{n(n-1)}\cdot[(\tilde{r}_n(t+k)-\tilde{r}_{n-1}(t+k)+l_{n-1}+\tilde{v}_n(t+k)\cdot t_{n(n-1)}^g(t+k))+\gamma_n\cdot(\tilde{v}_n(t+k)-\tilde{v}_{n-1}(t+l))]. \quad \text{Equation (13)}$$

In one approach, the parameters of Equation (13) may be set by the control system 170 according to Equation (5) for motion control of the ego vehicle i that is consensus-based. In particular, i=n and j=n−1. Accordingly, for this approach the longitudinal speed trajectory of vehicle n in the future may be:

$$\tilde{V}_n(t) = (\tilde{v}_n(t+1), \tilde{v}_n(t+2), \ldots, \tilde{v}_n(t+k), \ldots, \tilde{v}_n(t+N)). \quad \text{Equation (13-1)}$$

At 340, the control system 170 controls the motion of the ego vehicle using a motion estimate for the target vehicle. The control system 170 may use multiple models from the models 250 for the motion estimations of the target vehicle to account for conditions of the communication link. Furthermore, part or substantially all of the motion estimations may be executed on the edge server, cloud, and so on 402 to reduce load on the control system 170. In one approach, the ego motion may be an estimation according to a model based on one or more of Equations (8), (8-1), (9), and (9-1). In addition to the model, the control system 170 may use a modified model according to one or more of Equations (10) to (13-1). When the communication link with the target vehicle or cloud becomes stable without packet losses, the control system 170 can use the model to reliably control the ego motion.

In view of degradation to the communication link, the control system 170 may supplement the model with the modified model that accounts for packet losses and certain time delays. The modified model may effectively maintain an environment of cooperative driving with CAVs in an area during the packet losses and delay by the ego vehicle virtually maintaining an information flow. Thus, the control system 170 may use both the model and modified model to control the ego motion until the communication link improves by receiving packets and the delays fall below the criteria 260. In this way, ego vehicles in an area stay in cooperative mode instead of falling back to an automated mode needing more operator assistance or takeover.

At 350, the control system 170 calculates the motion estimate for the target vehicle according to a modified model for constant speed during packet losses and communication delays. In particular, when $\tau_{n(n-1)}(t+k) < \delta t$, the delay in the communication link may be less than the duration of a time-step for a prediction. In this approach, the control system 170 may use a modified model according to one or more of Equations (10) to (13-1). Similar to 330, the control system 170 may use both the model and modified model to control the ego motion until the communication link improves. In this way, the CAVs in an area stay in cooperative mode instead of falling back to an automated mode needing more operator assistance or takeover during smaller time-step values associated with communication delays.

Figure 5:
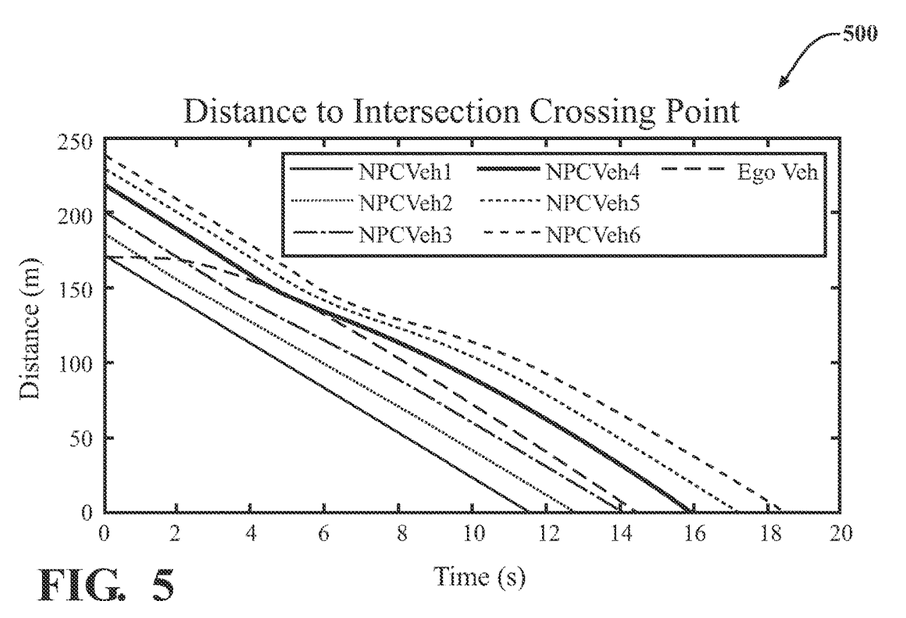
FIG. 5 illustrates ego vehicle and target vehicle(s) trajectories using a control for automated driving according to motion estimates.

Turning now to FIG. 5, an ego vehicle and target vehicle(s) trajectories using control for automated driving according to motion estimates are illustrated. The chart 500 shows the distance to a crossing point of an intersection over time between an ego vehicle (Ego Veh) and target vehicles (i.e. non-player characters (NPC) VehX) using the method 300. In the chart 500, CAVs may travel on different legs or directions of the intersection that are signalized or unsignalized using traffic lights. The CAVs use method 300 to coordinate with each other through V2X communications and cross intersections without full stops while maintaining cooperative driving through the actual or virtual existence of information flows.

In FIG. 5, the distance may be a ground-truth associated with the longitudinal trajectory of CAVs crossing the intersection. In addition, the ego vehicle may experience a time-variant delay and hybrid packet losses on a communication link during 4-6 seconds and 6-8 seconds, respectively. Using the method 300, the control of the ego vehicle results in a close encounter with NPC vehicle 4 due to the estimation error and degradation of the communication link. However, the ego vehicle avoids a collision with the CAVs in the area while maintaining cooperative driving during packet losses and delays using the method 300. In particular, the Ego Veh may use both the model and modified model of the models 250 to control the ego motion until the communication link improves or recovers by receiving packets and the delays fall below the criteria 260. Accordingly, the Ego Veh and NPCVeh1-6 safely cross the intersection while staying in a more preferred automated mode irrespective of communication link degradation.

Figure 6:
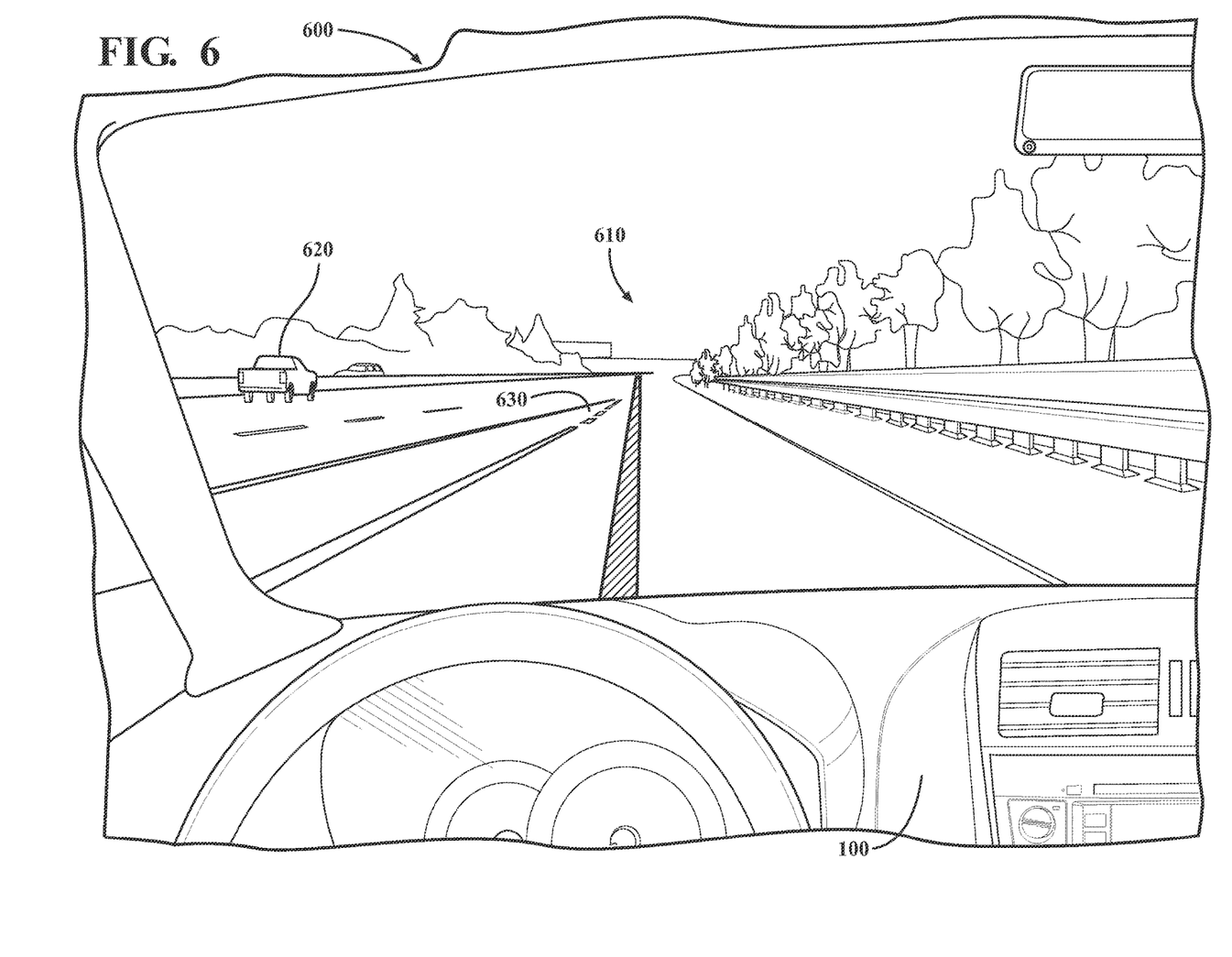
FIG. 6 illustrates a vehicle and a vehicle driving environment that involves motion control for an ego vehicle while maintaining cooperative driving.

Now turning to FIG. 6, the diagram illustrates a vehicle driving environment 600 that involves estimating motion for an ego vehicle while maintaining cooperative driving. In FIG. 6, vehicle 100 may be an ego vehicle controlling motion according estimated motion of the target vehicle 620. The driving environment 610 may include the vehicle 100 and the target vehicle 620 traveling on the expressway 630. In one approach, the vehicle 100 uses the method 300 to control motion according to the model or modified model during packet losses and/or communication losses. The method 300 is used by the control system 170 of the vehicle 100 so that cooperative driving is maintained between CAVs regardless of degradation of network conditions. In this way, the ego vehicles on the expressway 630 stay in cooperative mode instead of falling back to an automated mode needing operator participation.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store 115 can include volatile and/or non-volatile memory.

Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located on-board the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the control system 170, and/or the automated or autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement of the vehicle 100. The processor(s) 110, the control system 170, and/or the autonomous driving module(s) 160 may control some or all of the vehicle systems 140 and, thus, may be partially or fully autonomous as defined by the society of automotive engineers (SAE) levels 0 to 5.

The processor(s) 110, the control system 170, and/or the autonomous driving module(s) 160 can be operatively connected to communicate with the various vehicle systems 140 and/or individual components thereof. For example, returning to FIG. 1, the processor(s) 110, the control system 170, and/or the autonomous driving module(s) 160 can be in communication to send and/or receive information from the various vehicle systems 140 to control the movement of the vehicle 100. The processor(s) 110, the control system 170, and/or the autonomous driving module(s) 160 may control some or all of the vehicle systems 140.

The processor(s) 110, the control system 170, and/or the autonomous driving module(s) 160 may be operable to control the navigation and maneuvering of the vehicle 100 by controlling one or more of the vehicle systems 140 and/or components thereof. For instance, when operating in an autonomous mode, the processor(s) 110, the control system 170, and/or the autonomous driving module(s) 160 can control the direction and/or speed of the vehicle 100. The processor(s) 110, the control system 170, and/or the autonomous driving module(s) 160 can cause the vehicle 100 to accelerate, decelerate ( ) and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the autonomous driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the control system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 240. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A control system comprising:
   a memory communicably coupled to a processor and storing:
   a control module including instructions that when executed by the processor cause the processor to:
   monitor, by an ego vehicle, a communication link for motion data of a target vehicle, used in a model to determine motion, for motion planning by the ego vehicle;
   estimate a trajectory of the target vehicle according to a motion estimate by the model when criteria for the communication link associated with packet losses and delays unsatisfy a level;
   adjust the motion estimate using a modified model that adapts for speed of the target vehicle by factoring the delays when the criteria for the communication link satisfy the level, the ego vehicle maintains cooperative driving with virtual information flows over the communication link during the delays and the motion estimate varies by the modified model factoring a difference between the delays and a time-step duration of the communication link such that the motion estimate is constant when the delays are less than the time-step and the motion estimate varies using a graph topology of a road when the delays are greater than the time-step; and
   control the ego vehicle according to the trajectory and the motion estimate.

2. The control system of claim 1, wherein the control module further includes instructions to maintain, by the ego vehicle, the cooperative driving by using the trajectory and the motion estimate while the packet losses and the delays satisfy the criteria, wherein the cooperative driving utilizes an adjacency matrix representing the graph topology of the road between the ego vehicle and the target vehicle for reaching a longitudinal convergence of a headway space having gains that are tuned with a feed-forward function for driving comfort.

3. The control system of claim 1, wherein the control module further includes instructions to calculate whether the delays satisfy the criteria according to the time-step duration being associated with the communication link of the ego vehicle and the target vehicle for an upcoming intersection.

4. The control system of claim 1, wherein the control module includes instructions to adjust the motion estimate further including instructions to adjust longitudinal position of the ego vehicle according to the time-step duration of the communication link.

5. The control system of claim 1, wherein the control module further includes instructions to receive, by the ego vehicle, a ground-truth associated with the motion data of the target vehicle when the delays do not satisfy the criteria.

6. The control system of claim 1, wherein the control module further includes instructions to maintain, by the ego vehicle, the virtual information flows while keeping a headway space with the target vehicle that is steady and the headway space having gains that are tuned with a feed-forward function for driving comfort.

7. The control system of claim 1, wherein the modified model accounts for adapted speed or steady speed for the target vehicle by factoring the packet losses and the delays.

8. The control system of claim 1, wherein the control module further includes instructions to determine a motion plan according to a ground-truth of the target vehicle received when the criteria are unsatisfied.

9. A non-transitory computer-readable medium comprising:
   instructions that when executed by a processor cause the processor to:
   monitor, by an ego vehicle, a communication link for motion data of a target vehicle, used in a model to determine motion, for motion planning by the ego vehicle;
   estimate a trajectory of the target vehicle according to a motion estimate by the model when criteria for the communication link associated with packet losses and delays unsatisfy a level;
   adjust the motion estimate using a modified model that adapts for speed of the target vehicle by factoring the delays when the criteria for the communication link satisfy the level, the ego vehicle maintains cooperative driving with virtual information flows over the communication link during the delays and the motion estimate varies by the modified model factoring a difference between the delays and a time-step duration of the communication link such that the motion estimate is constant when the delays are less than the time-step and the motion estimate varies using a graph topology of a road when the delays are greater than the time-step; and
   control the ego vehicle according to the trajectory and the motion estimate.

10. The non-transitory computer-readable medium of claim 9, further including instructions that when executed by the processor cause the processor to maintain, by the ego vehicle, the cooperative driving by using the trajectory and the motion estimate while the packet losses and the delays satisfy the criteria, wherein the cooperative driving utilizes an adjacency matrix representing the graph topology of the road between the ego vehicle and the target vehicle for reaching a longitudinal convergence of a headway space having gains that are tuned with a feed-forward function for driving comfort.

11. The non-transitory computer-readable medium of claim 9, further including instructions that when executed by the processor cause the processor to calculate whether the delays satisfy the criteria according to the time-step duration being associated with the communication link of the ego vehicle and the target vehicle for an upcoming intersection.

12. The non-transitory computer-readable medium of claim 9, further including instructions that when executed by the processor cause the processor to adjust longitudinal position of the ego vehicle according to the time-step duration of the communication link.

13. A method, comprising:
    monitoring, by an ego vehicle, a communication link for motion data of a target vehicle, used in a model to determine motion, for motion planning by the ego vehicle;

estimating a trajectory of the target vehicle according to a motion estimate by the model when criteria for the communication link associated with packet losses and delays unsatisfy a level;

adjusting the motion estimate using a modified model that adapts for speed of the target vehicle by factoring the delays when the criteria for the communication link satisfy the level, the ego vehicle maintains cooperative driving with virtual information flows over the communication link during the delays and the motion estimate varies by the modified model factoring a difference between the delays and a time-step duration of the communication link such that the motion estimate is constant when the delays are less than the time-step and the motion estimate varies using a graph topology of a road when the delays are greater than the time-step; and controlling the ego vehicle according to the trajectory and the motion estimate.

14. The method of claim 13, further comprising maintaining, by the ego vehicle, the cooperative driving by using the trajectory and the motion estimate while the packet losses and the delays satisfy the criteria, wherein the cooperative driving utilizes an adjacency matrix representing the graph topology of the road between the ego vehicle and the target vehicle for reaching a longitudinal convergence of a headway space having gains that are tuned with a feed-forward function for driving comfort.

15. The method of claim 13, further comprising calculating whether the delays satisfy the criteria according to the time-step duration being associated with the communication link of the ego vehicle and the target vehicle for an upcoming intersection.

16. The method of claim 13, further comprising adjusting longitudinal position of the ego vehicle according to the time-step duration of the communication link.

17. The method of claim 13, further comprising receiving, by the ego vehicle, a ground-truth associated with the motion data of the target vehicle when the delays do not satisfy the criteria.

18. The method of claim 13, further comprising maintaining, by the ego vehicle, the virtual information flows while keeping a headway space with the target vehicle that is steady and the headway space having gains that are tuned with a feed-forward function for driving comfort.

19. The method of claim 13, wherein the modified model accounts for adapted speed or steady speed for the target vehicle by factoring the packet losses and the delays.

20. The method of claim 13, further comprising determining a motion plan according to a ground-truth of the target vehicle received when the criteria are unsatisfied.

* * * * *

UNITED STATES PATENT AND TRADEMARK OFFICE
CERTIFICATE OF CORRECTION

PATENT NO. : 11,827,245 B2
APPLICATION NO. : 17/196016
DATED : November 28, 2023
INVENTOR(S) : Ziran Wang et al.

Page 1 of 2

It is certified that error appears in the above-identified patent and that said Letters Patent is hereby corrected as shown below:

In the Specification

Equation (7) at Column 8, Lines 64 and 65, please replace:

"
$$\dot{r}_i(t) = v_i(t)$$
$$\dot{v}_i(t) = -a_{ij}k_{ij} \cdot \left[\left(r_i(t) - r_j(t - \tau ij\,(t)) + l_j + v_i(t) \cdot t_{ij\theta}(t)\right) + \gamma_i \left(v_i(t) - v_j(t - \tau ij\,(t))\right)\right]
$$
,"

With:

--
$$\dot{r}_i(t) = v_i(t)$$
$$\dot{v}_i(t) = -a_{ij}k_{ij} \cdot \left[\left(r_i(t) - r_j\left(t - \tau_{ij}\,(t)\right) + l_j + v_i(t) \cdot t_{ij}^g(t)\right) + \gamma_i \left(v_i(t) - v_j\left(t - \tau_{ij}\,(t)\right)\right)\right]
$$
--.

Column 9, Line 4, please replace:
"V$_j$(*t*) and R$_j$(*t*)"
With:
--$\tilde{V}_j$(*t*) and $\tilde{R}_j$(*t*)--.

Column 9, Line 10, please replace:
"estimate"
With:
--estimates--.

Column 9, Line 10, please replace:
"V$_j$(*t*)"
With:
--$\tilde{V}_j$(*t*)--.

Column 9, Line 18, please replace:
"estimatest"

Signed and Sealed this
Fourth Day of February, 2025

Coke Morgan Stewart
*Acting Director of the United States Patent and Trademark Office*

CERTIFICATE OF CORRECTION (continued)
U.S. Pat. No. 11,827,245 B2

With:
--estimates--.

Equation (9-1) at Column 9, Line 66, please replace:

" $\tilde{R}_n(t) = \left(r\tilde{r}_n(t+1), r\tilde{r}_n(t+2), \ldots, r\tilde{r}_n(t+k), \ldots, r\tilde{r}_n(t+N)\right).$ "

With:

-- $\tilde{R}_n(t) = \left(\tilde{r}_n(t+1), \tilde{r}_n(t+2), \ldots, \tilde{r}_n(t+k), \ldots, \tilde{r}_n(t+N)\right).$ --.

Equation (13) at Column 10, Lines 66 and 67, please replace:

" $\tilde{v}_n(t+k) = \tilde{v}_n(t+k-1) - \alpha_{n(n-1)}k_{n(n-1)} \cdot \left[\left(\tilde{r}_n(t+k) - \tilde{r}_{n-1}(t+k) + l_{n-1} + \tilde{v}_n(t+k) \cdot t_{n(n-1)}g(t+k)\right) + \gamma_n \cdot \left(\tilde{v}_n(t+k) - \tilde{v}_{n-1}(t+l)\right)\right].$ "

With:

-- $\tilde{v}_n(t+k) = \tilde{v}_n(t+k-1) - \alpha_{n(n-1)}k_{n(n-1)} \cdot \left[\left(\tilde{r}_n(t+k) - \tilde{r}_{n-1}(t+k) + l_{n-1} + \tilde{v}_n(t+k) \cdot t^g_{n(n-1)}(t+k)\right) + \gamma_n \cdot \left(\tilde{v}_n(t+k) - \tilde{v}_{n-1}(t+l)\right)\right].$ --.